United States Patent [19]

Duncan et al.

[11] 4,005,490
[45] Jan. 25, 1977

[54] MAGNETIC DISC MEMORY

[75] Inventors: Damon H. Duncan; Craig T. Herdman; Terrance V. Littlejohn, all of Phoenix, Ariz.

[73] Assignee: Sperry Rand Corporation, New York, N.Y.

[22] Filed: May 15, 1975

[21] Appl. No.: 577,970

[52] U.S. Cl. .............................. 360/97; 360/103; 360/104; 360/135
[51] Int. Cl.² .................. G11B 5/60; G11B 25/04; G11B 21/20
[58] Field of Search .............................. 360/97–99, 360/104, 86, 102, 103, 133, 135; 346/137

[56] References Cited

UNITED STATES PATENTS

| | | | |
|---|---|---|---|
| 2,907,007 | 9/1959 | Baker et al. | 360/100 |
| 3,864,748 | 2/1975 | Herdman et al. | 360/102 |

*Primary Examiner*—Alfred H. Eddleman
*Attorney, Agent, or Firm*—Howard P. Terry

[57] ABSTRACT

A magnetic disc memory characterized by a symmetrical configuration in which an electrical drive motor is located along the axis of symmetry and within the normally unuseable inner diameter of a magnetic disc. The disc is secured to the rotor assembly of the electrical drive motor which rotates around a fixed stator assembly. Additionally, the storage capacity and the reliability of the memory is improved by the use of both sides of the disc, incorporation of multi-track cores to increase the number of data tracks per core, and an improved pre-loading system to properly align the gas-bearing cores with the disc during operation.

9 Claims, 5 Drawing Figures

MAGNETIC DISC MEMORY

BACKGROUND OF THE INVENTION

1. Field of the Invention

The invention pertains to magnetic disc memories and more particularly to magnetic disc memories for digital computers adapted for application in an environment where the memory is subjected to substantial vibration, wide variations in temperature and humidity and where mass and volume must be kept at a minimum, such as airborne applications.

2. Description of the Prior Art

The subject invention is an improvement over the device disclosed in copending application Ser. No. 381,817 now U.S. Pat. No. 3,864,748 entitled "Magnetic Disc Memory" of Craig T. Herdman et al., filed July 23, 1973 and assigned to the assignee of the present invention. The invention of Ser. No. 381,817, although representing a significant improvement in the art of magnetic disc memories, is nonetheless subject to certain limitations. To begin with, the location of the electrical drive motor in this invention adds to the total volume of the memory and creates an unsymmetrical configuration. Secondly, since the disc is mounted to an arbor which extends from the electrical drive motor, the bearings of the motor are subjected to a bending moment due to the cantilevered structure resulting in increased wear thereon. Thirdly, because the electrical drive motor must be kept as small as possible to minimize the external volume, minimum bearing separation must be maintained thereby hindering the bearing alignment.

The memory capacity of the prior art device is limited to approximately one million bits due to several factors. Firstly, only one side of the magnetic disc is being utilized for the storage and retrieval of information. Secondly, maximum utilization of the magnetizable surface of the magnetic disc is not being achieved. Thirdly, a symmetrical configuration of this memory, specifically with respect to the location of the electrical drive motor, inhibits the use of both sides of the magnetic disc with regard to utilizing common parts and assemblies.

The alignment of the spring mechanism, which urges the read/write head assemblies to the magnetizable surface of the magnetic disc without producing pitching moments introduces another limitation into this device. In the prior art memory, a button with a flat top is located at the center of buoyancy of the read/write head assembly. To prevent pitching moments from developing, the spring must align almost exactly with the center of the flat-top button. In practice, this alignment often proves to be time consuming and may eventually deteriorate.

The extension and retraction mechanism, incorporated to extend and retract the read/write head assemblies toward and away from, respectively, the surface of the magnetic disc, introduces a pair of limitations. Firstly, they add substantial complexity in cost of the support mechanism for the read/write head assemblies. Secondly, they require the addition of magnetic coils and a plate (which acts as an armature) to operate the mechanisms. This complicates the design, and increases the cost, the volume, and the mass of the memory.

The present invention overcomes all of the aforementioned limitations while maintaining all the significant improvements of the prior invention. Additionally, the present invention discloses additional features to improve the symmetry of the memory, reduce the volume and increase the storage capacity.

SUMMARY OF THE INVENTION

The present invention comprises a magnetic disc memory characterized by a symmetrical configuration and increased storage capacity. More particularly, the memory is comprised of a cylindrical-shaped frame with a pair of plates bridging the ends thereof. The plates support a central shaft, disposed along the axis of symmetry, which in turn supports the stator of an electrical drive motor. The rotor of the drive motor, which surrounds the stator, is supported by the shaft for rotation about the axis of symmetry. The magnetic disc is assembled about the periphery of the rotor for rotation about the axis of symmetry. At least one and preferably a plurality of read/write head assemblies, each of which includes at least one air bearing core assembly are supported by one or both bridging plates such that the core assemblies extend toward the surfaces of the magnetic disc. Additionally, the core assemblies of the read/write head assemblies are capable of defining at least one and preferably two storage tracks for the storage and retrieval of information. A pair of covers are also utilized to enclose the apparatus and seal therein a gas utilized for the air bearing.

DESCRIPTION OF THE PREFERRED EMBODIMENT

Figure 1:
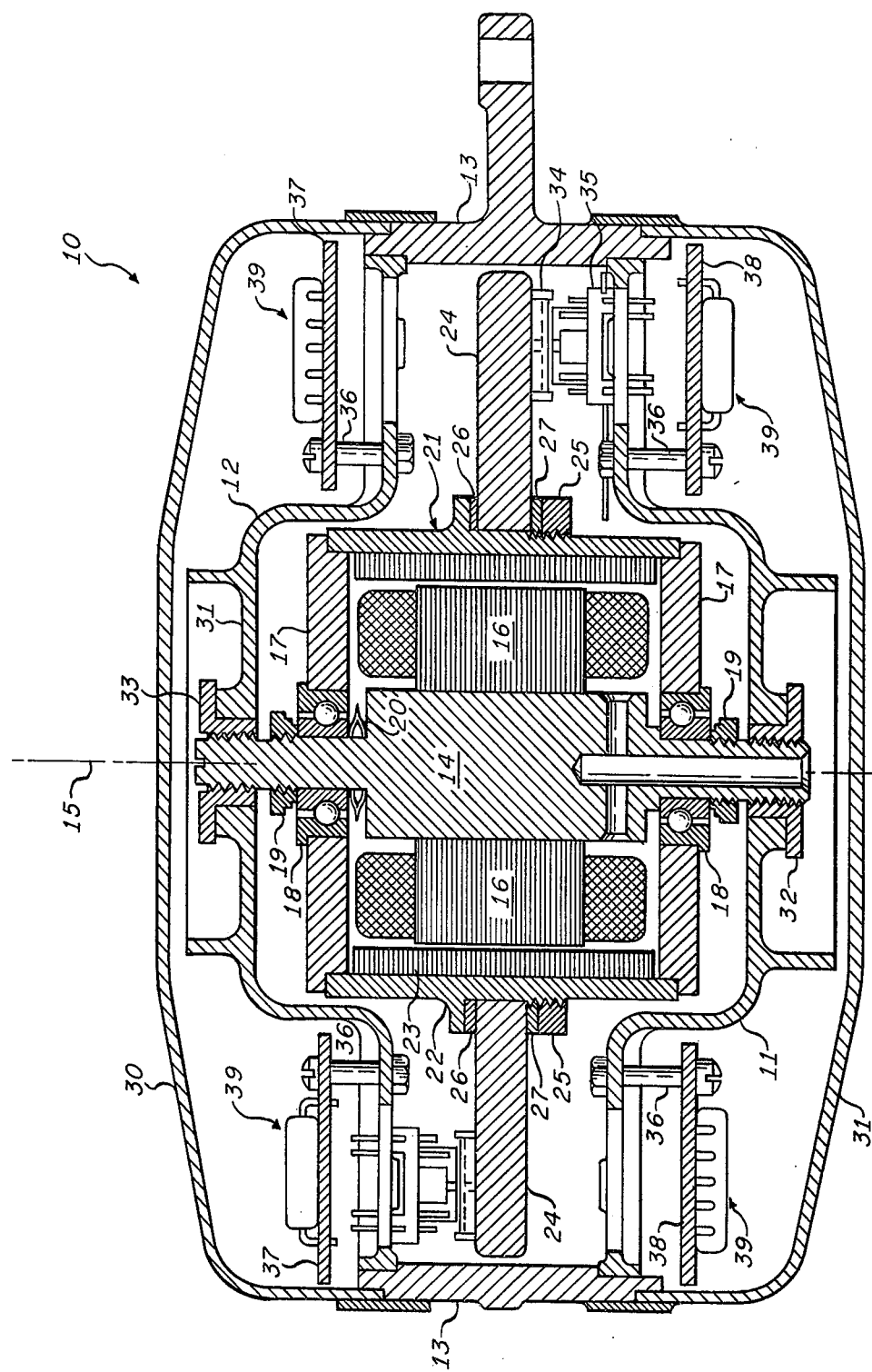
FIG. 1 is a longitudinal cross-sectional view of the magnetic disc memory of the present invention.

FIG. 1 depicts the apparatus 10 which comprises the present invention. It will be noted, at the outset, that the over-all configuration of the magnetic disc memory incorporates technology required in the design and manufacture of precision airborne gyroscopic apparatus.

A pair of bridge plates 11 and 12 are secured between an annular, generally cylindrical-shaped frame 13. A central shaft 14, which defines the axis of rotation 15, and acts as the main disc and motor support structure, is secured between bridge plates 11 and 12 and disposed along the axis of symmetry of the apparatus 10. A stator assembly 16 is affixed to the central shaft 14 as illustrated. A pair of end bells 17 are coupled to the central shaft 14 and supported for rotation about the axis of rotation 15 by bearing assemblies 18. The end bell and bearing assemblies are held in place and pre-loaded by a pair of nuts 19. A pair of belleville washers 20, inserted between a bearing assembly 18 and a shoulder of the central shaft 14, compensate for variations in the machining of the components. A rotor assembly 21 is disposed between the perimeters of the two end bells 17 and supported thereby. The rotor assembly 21 includes a rotor 22 and a motor cage 23 connected together, preferably, by means of a press fit. The magnetic disc 24 is assembled circumferentially about the rotor assembly 21 and fastened thereto by means of clamping nut 25 in cooperation with washers 26 and 27. The bridge plates 11 and 12, which support the central shaft 14 in cooperation with bridge plate nuts 32 and 33, respectively, also support a plurality of read/write head assemblies 34 and their respective support assemblies 35. Moreover, bridge plates 11 and 12 additionally support, by means of a plurality of spaces 36, printed circuit boards 37 and 38, to which, electronic such as hybrid electronic package 39 are connected. Covers 30 and 31 are secured to the frame 13 enclosing the apparatus 10 and sealing a gas therein.

The electrical drive motor assembly comprising the shaft 14, stator 16, bearings 18, end bells 17, and the rotor assembly 21 is designed so that the rotor assembly 21, in cooperation with the end bell 17 and the bearings 18, rotate externally to the stator 16 as opposed to within the stator as in known prior art magnetic disc memory electrical drive motors. This design permits the electrical drive motor assembly to be relocated to the central position within the apparatus 10. A magnetic disc 24 is disposed about the external perimeter of the rotor assembly 21 midway between the end bell 17 thereby eliminating the need, which exists in the prior art, for a balanced arbor assembly extending some distance from the rotor.

The relocation of the electrical drive motor in the present invention does not affect the storage capacity but rather permits the effective use of the volume ordinarily displaced by the normally unuseable inner area of the magnetic disc 24. This area is normally considered unuseable since it is economically impractical to use this portion of the disc for storage. More particularly, in the present system, as in most disc systems, an equal number of bits are written on each track irrespective of the track radius. As such, the factor limiting the number of bits written on each track is the minimum allowable bit spacing on the inner track. Given these constraints, the maximum disc storage capacity is achieved by limiting the inner track radius to one-half the outer track radius plus one-half the distance between track centers.

The location of the magnetic disc 24 between the bearings 18 increases the durability of the apparatus 10 while limiting the bending moments on the bearings due to the cantilever structure in the prior art. Furthermore, since the electrical drive motor is centrally located, the separation distance between the bearing assemblies 18 may be increased, thereby improving the alignment thereof. Additionally, the present invention utilizes both sides of the magnetic disc 24 which, in addition to the symmetrical location of the electrical drive motor, enables the use of common parts on both sides of the disc and reduces the total volume of the apparatus 10.

In order to prevent disc-rotor slippage due to dimensional changes over the operating temperature range of the memory apparatus, the spacer washers 26 and 27, the rotor or disc 24 and the rotor assembly materials are selected such that their net coefficient of expansion of the interface is made equal to zero.

Figure 2:
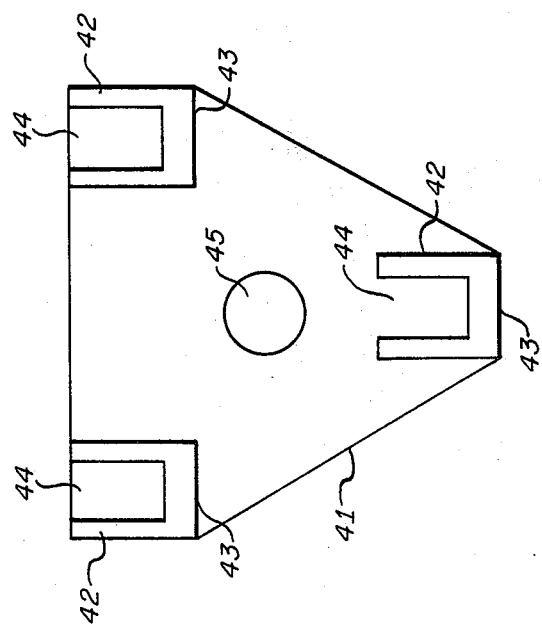
FIG. 2 illustrates the read/write head assembly and, in particular, the incorporation of the multi-track cores.

The read/write head assembly 34 is preferably a trimaran head as disclosed generally in application Ser. No. 381,317 now U.S. Pat. No. 3,864,748. The trimaran head, depicted in FIG. 2, is comprised of an equilateral triangular-shaped member 41. At each apex of the triangular-shaped member 41, a core is mounted in a manner such that an equal portion of each core extends from the triangular-shaped member 41 towards a surface of the magnetic disc 24. The head assembly 34 is disposed so that one of the apexes leads with respect to the velocity vector of the magnetic disc while the remaining two apexes trail. Furthermore, the cores, are fabricated so that the leading edge 43 with respect to disc velocity vector is ground or lapped to form a small angle relative to the plane of the surface of the magnetic disc 24. This small angle provides a gas inlet surface so that, with the disc rotating at high speed, a gas-bearing a few millionths of an inch thick is formed between the multi-track cores 42 and the surface of the magnetic disc 24 and the head assembly 34 floats or "flys" on this three-point gas-bearing.

The present invention incorporates a core which is capable of defining at least one and preferably two storage tracks in the surface of the disc 24. Specifically, as depicted in FIG. 2, an interior portion 44 of the core 42 is removed from the core leaving two finger-like projections extending from the leading edge such that the projections trail the leading edge of the core with respect to disc velocity vector. A magnetizing coil (not shown) is fabricated about each of these projections thereby creating a dual-track core.

The triangular-shaped member is also fabricated with a circular cavity 45 located at a point which is coincident with the center of buoyancy of the head assembly 34. The circular cavity 45 is provided to support a load button 46 whose function will be described hereinafter, and which may be fastened to member 41 by any one of a plurality of techniques.

Figure 4:
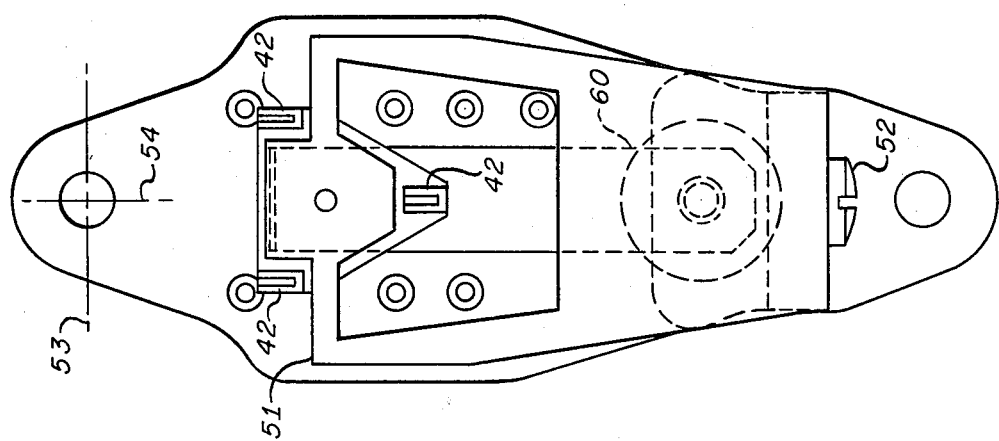
FIG. 4 illustrates a bottom view of the combination depicted in FIG. 3.
Figure 3:
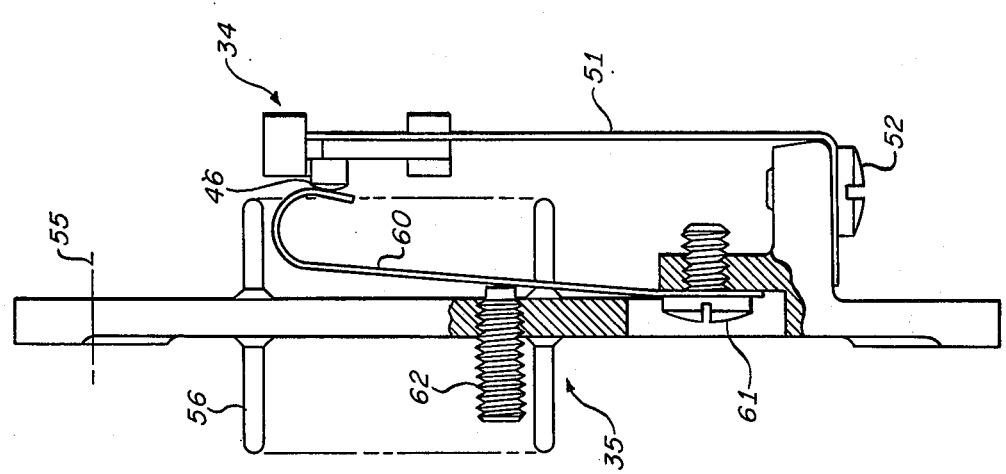
FIG. 3 illustrates a side view of the read/write head assembly in combination with the head support assembly.

FIGS. 3 and 4 present two views of the trimaran head in combination with the head support assembly 35, a plurality of which may be mounted on both bridge plates 30 and 31. Initially, it should be noted that the extension and retraction mechanism of the prior art reference has been eliminated. Instead, the trimaran head is allowed to "land" on the surface of the magnetic disc and remain therein while the magnetic disc remains at rest. Under operating conditions (rotation of the magnetic disc at operational angular velocity) the trimaran head will "take-off" and remain suspended on a thin film of gas in the conventional manner. Holding spring 51 is anchored to the head support assembly by means of screw 52 and provides alignment and support for the trimaran head assembly 34. Additionally, holding spring 51, shown in more detail in FIG. 4, permits limited rotational freedom of the trimaran head 34 about the pitch axis 53 and the roll axis 54 while maintaining the head rigid as to rotation about the yaw axis 55. This enables the head assembly 34 to adapt to disc irregularities or undulations.

A second spring 60, attached to the support assembly 35 by means of a screw 61, is provided to exert a force on the load button 46 with which to urge the head assembly 34 towards the surface of the magnetic disc 24. The amount of pressure exerted on load button 46 is varied by means of a screw 62 and is set, preferably, to maintain a predetermined gap of a few micro-inches between the cores 42 and the surface of the magnetic disc 24.

A plurality of termination posts 56 are mounted in the support assembly 35 to provide electrical couplings between the trimaran head and printed circuit boards 37 and 38. More particularly, the termination posts 56 are electrically connected between the cores 42 and the hybrid electronic packages 39 on the printed circuit boards. The hybrid electronic packages form a head selection matrix which enables each finger-like projection of a multi-track core in cooperation with the corresponding coil (not shown) to "write" magnetically polarized information on the surface of the disc 24. The present invention utilizes hybrid diode packages, each of which replaces a plurality of individual diode semiconductors, and which add to the reliability and durability of the apparatus 10.

The prior art magnetic disc memory, referred to herein, utilized a bridge plate whereon eight trimaran heads with single-track cores and corresponding support assemblies were mounted. This configuration yielded a memory system with a storage capacity of approximately 1 million bits. The present invention, utilizing the same size magnetic disc and two bridge plate assemblies each of which has mounted thereon eight trimaran heads and with dual-track cores and the associated support assemblies, reaches a storage capacity of approximately 4 million bits, since the capacity of the prior art device is doubled by the use of both sides of the magnetic disc 24 and doubled once again by the incorporation of dual-track cores 42 on the trimaran heads 35.

Figure 5:
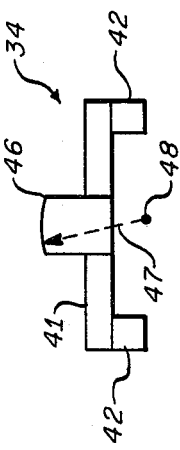
FIG. 5 illustrates a cross-sectional view of the spherically surfaced load-button assembled to the read/write head assembly.

FIG. 5 depicts the novel features of the load button 46. The load button 46 is precisely located on the trimaran head assembly 34 so as to coincide with the center of buoyancy thereof. The purpose for this location is to insure a symmetrical and even approach for the three multi-track cores 42 in response to the force exerted by spring 60. An unsymmetrical approach may result in an overturning force on the head assembly causing variations in core flying heights which in turn causes undesirable performance variations between cores. In some instances, the variations in core loading may prevent the head assembly from "flying".

If a conventional flat top load button is utilized, the spring 60 must be critically aligned with the center thereof. Any divergence therefrom may result in the above-mentioned detrimental effects. This alignment often proves difficult to perform and furthermore may deteriorate after a period of time. The load button 46 of the present invention is designed to overcome this difficulty. The contacting surface with respect to the spring 60 is carefully machined to insure that the force transmitted by the load button to the trimaran head assembly 34 will always act through a predetermined preload point 48 irrespective of the point of contact between the spring 60 and the surface of the load button 46. Specifically, this surface is spherically shaped wherein the radius 47 of the sphere is measured from the desired preload point 48 (the point through which it is desired to direct the force from the spring 60) to each and every point on the surface of the load button 46.

It will be appreciated therefore that the present invention comprises an improved magnetic disc memory system. The electrical drive motor is designed so that the rotor spins externally with respect to the stator and the motor is located at the symmetrical center of the memory system. This results in a more symmetrical design which enhances the use of both sides of the magnetic disc, reduces the total volume consumed by the apparatus and reduces the wear on the bearings of the motor. The invention further includes a novel multi-track core which, without increasing the number of cores or head assemblies, has increased the storage capacity of the system. This improvement in conjunction with the use of both sides of the magnetic disc has quadrupled the storage capacity of the present invention over the prior art device. The invention also encompasses a novel technique for insuring the proper application of the preloading force to the trimaran head assemblies by incorporation of a load button which directs the force exerted by the preloading spring to the desired preload point irrespective of the point of contact between the preload spring and the load button. The support mechanism for the trimaran head has been improved by the elimination of the extension and retraction mechanisms and the associated equipment thereby reducing the cost and the complexity thereof. Individual semiconductor diodes have been replaced by hybrid packages which increase the reliability and durability of the apparatus. Finally, the apparatus is evacuated and backfilled with a gas and hermetically sealed to permit the operation of the apparatus in high humidity, high altitude and/or low temperature environments.

While the invention has been described in its preferred embodiments, it is to be understood that the words which have been used are words of description rather than limitation and that changes may be made within the purview of the appended claims without departing from the true scope and spirit of the invention in its broader aspects.

We claim:
1. A magnetic disc memory comprising:
    a symmetrical housing including a generally cylindrical-shaped frame and a pair of members bridging the ends of the cylindrical-shaped frame;
    central support means, secured between said bridging members, and disposed to substantially coincide with the axis of symmetry of said housing;
    motor means including a stator affixed to said central support means and a rotor surrounding said stator and journalled for rotation about said central support means;
    disc means secured to and disposed in circumferential relationship to the outer periphery of said rotor and extending radially outward therefrom;
    both annular surfaces of said disc means being magnetizable; and
    at least one read/write head assembly mounted on each bridging member and extending toward a respective magnetizable surface of said disc means.
2. The magnetic disc memory of claim 1 further including at least one printed circuit board secured to each bridging member for supporting electronic circuitry electrically coupled to the respective read/write head assemblies.
3. The magnetic disc memory of claim 1 further including covers for enclosing said housing and sealing a gas therein.
4. The magnetic disc memory of claim 3 wherein each read/write head assembly comprises a base and at least one gas-bearing core secured to the base and extending therefrom toward a magnetizable surface of said disc and wherein each core is fabricated to fly on a film of gas between itself and a magnetizable surface of said disc when said disc is rotated by said motor means.

5. The magnetic disc memory of claim 4 wherein each core is configured to define at least one recording track on a magnetizable surface of said disc means.

6. The magnetic disc memory of claim 5 wherein the leading portion of the extended core, with respect to the velocity vector of said disc means, is lapped to form said configuration for flying on the film of gas, and wherein the remaining portion of the extended part of the core is bifurcated to form two finger-like projections for defining two recording tracks on a magnetizable surface of said disc means.

7. The magnetic disc memory of claim 4 wherein each read/write head assembly further includes means for applying a force to the base and urging the same toward a magnetizable surface of said disc means and means disposed on the base for receiving the force and directing the force through a desired preload point irrespective of the point of contact between the means for exerting the force and the means for accepting the force.

8. The magnetic disc memory of claim 7 wherein the means for receiving the force is comprised of a member whose surface which comes in contact with the means for exerting the force, is fabricated in the shape of a sphere, the radius of which is measured from a desired preload point to any point on the contacting spherical surface.

9. The magnetic disc memory of claim 4 wherein each read/write head assembly mounted on a bridging member is disposed at a different radial distance from the axis of symmetry such that a plurality of radially spaced recording tracks are defined on a magnetizable surface of said disc means.

* * * * *